United States Patent [19]

Adamczyk

[11] 4,392,678

[45] Jul. 12, 1983

[54] END FITTINGS FOR FLEXIBLE HOSES

[75] Inventor: Rudolph A. Adamczyk, Ludlow, Mass.

[73] Assignee: Titeflex Corporation, Springfield, Mass.

[21] Appl. No.: 193,341

[22] Filed: Oct. 3, 1980

Related U.S. Application Data

[63] Continuation of Ser. No. 49,645, Jun. 18, 1979, abandoned.

[51] Int. Cl.³ ............................................. F16L 33/20
[52] U.S. Cl. .................................... 285/256; 29/508; 29/520; 285/259
[58] Field of Search ...................... 285/256, 258, 259; 29/508, 520

[56] References Cited

U.S. PATENT DOCUMENTS

| 2,028,316 | 1/1936 | Brunner | 285/256 |
| 2,216,839 | 10/1940 | Hoffman | 285/258 |
| 2,319,586 | 5/1943 | Clench | 285/256 |
| 2,341,003 | 2/1944 | Watson | 285/256 |
| 2,704,074 | 3/1955 | Butler | 285/256 X |
| 2,795,041 | 6/1957 | Klinksiek et al. | 285/256 X |
| 2,926,029 | 2/1960 | St. Clair et al. | 285/256 |
| 3,165,338 | 1/1965 | Moss | 285/256 |
| 3,245,699 | 4/1966 | Peterman | 285/256 X |
| 3,345,091 | 10/1967 | Nicol | 285/256 |
| 3,539,207 | 11/1970 | Harris | 285/256 |

FOREIGN PATENT DOCUMENTS

| 283941 | 5/1965 | Australia | 285/256 |
| 2459690 | 6/1975 | Fed. Rep. of Germany | 285/256 |
| 2626608 | 12/1976 | Fed. Rep. of Germany | 285/256 |
| 1317618 | 5/1973 | United Kingdom | 285/256 |

Primary Examiner—Thomas F. Callaghan
Attorney, Agent, or Firm—Louis Bernat

[57] ABSTRACT

A two-piece self-locking end fitting is made from a collar which fits over the end of a plastic hose and an annularly serrated insert which fits within the hose. In one embodiment, after the collar is placed over the end of a thick-walled hose, the insert is placed inside the end of the hose. In another embodiment, an insert is first placed inside a thin-walled hose to give it added body and rigidity. Then, the collar is slipped over the outside end of the hose. In either embodiment, a swaging die is drawn over the collar to reduce its diameter and thereby capture the hose against the annular serrations of the insert. As the diameter reduces, an annular ridge in the collar is automatically canted into an annular valley in the insert to securely lock them together. After the cant takes place, further compression causes the ridge to elongate and lock the insert firmly so that it cannot move relative to the collar, which in turn provides the primary gripping force to hold the hose and fitting together.

3 Claims, 8 Drawing Figures

END FITTINGS FOR FLEXIBLE HOSES

This is a continuation of application Ser. No. 49,645, filed June 18, 1979, now abandoned.

This invention relates to hose—especially plastic hose—assemblies, and more particularly to end fittings for such hoses.

For background information which may be helpful to an understanding of this invention, reference may be made to the following patents:

| U.S. Pat. No. | Inventor(s) | Title | Date Issued |
| --- | --- | --- | --- |
| 3,252,720 | Waite | SWIVEL-TYPE HOSE COUPLING | May 24, 1966 |
| 3,672,704 | Christianson | LIP-SEAL FITTING | June 27, 1972 |
| 3,913,625 | Gazda et al. | POLY-POLYMER PLASTIC MATERIAL AND DEVICE MADE THEREFROM | Oct. 21, 1975 |
| 3,916,488 | Gazda et al. | POLY-POLYMER PLASTIC DEVICE | Nov. 4, 1975 | and the following copending patent applications:

| U.S. Serial No. | Inventors | Title | Date Filed |
| --- | --- | --- | --- |
| 884,612 now U.S. Pat. No. 4,190,088 | Lalikos et al. | CHAFE OR FIRE SLEEVE HOSE | Mar. 8, 1978 |
| 885,389 now U.S. Pat. No. 4,196,031 | Lalikos et al. | MEANS FOR AND METHOD OF MAKING A PREFORMED SEMIRIGID PLASTIC HOSE WRAPPED WITH A WIRE SPIRAL | Mar. 10, 1978 |

(The Gazda et al. and Lalikos et al. patents show plastic hoses made of materials using polytetrafluoroethylene (sintered "Teflon" powder mixed with silicone rubber)).

which patent applications are assigned to the assignee of this invention.

There are many uses for hoses of these contemplated types, one of which is exemplified by a fuel hose on a high performance aircraft. The hose requirements for such an aircraft are very exacting, since the operating environment ranges from hot desert sands to the frigid, low pressure atmosphere of extremely high altitude. The conditions aboard the aircraft encompass an extremely high temperature at the jet engine, an extremely low temperature at the fuel tank, vibration within the airframe, and the many G's of stress, as during tight turns at extremely high speed. In the presence of a fire, the hose becomes a refractory which tends to become brittle and ablates as taught by the above-identified Gazda et al. and Lalikos et al. patents.

The hose must be attached, at its two ends, to suitable aircraft parts. For example, at one end, a threaded fitting may be attached to a fuel tank, and, at the other end, a threaded fitting may be attached to a jet engine. Again, the fitting and its junction with the hose must survive the same hostile environment which is described above, with respect to the hose. In addition, the fitting must fulfill extra requirements. It must withstand a tightening (or even over-tightening) of screw threads, and it must remain attached to the hose, in a fluid sealing manner. It must not lose its integrity in the hostile environment of flight or when the screw threads are repeatedly tightened. The fitting-to-hose interface must not deteriorate in the presence of fire or as a result of an ablation of the hose material.

One result of these stringent requirements has been an extremely expensive fitting, as compared to other fittings used under less demanding conditions. Beyond the monetary expense of the fittings, there may be the tragic consequence of a failure, such as one which sprays pressurized jet fuel over a hot engine or into a fire, for example.

Accordingly, an object of the invention is to provide new and improved fittings for the end of fuel lines and similar hoses.

Another object of the invention is to provide end fittings which are reliable in extremely hostile environments. In this connection, an object is to provide very low-cost end fittings which maintain their integrity and withstand fire and ablation of the hose of the type taught by Gazda et al. and Lalikos et al.

Still another object of the invention is to provide very low-cost fittings which may be manufactured on low-cost, simple and easily constructed machines. Here, an object is to provide end fittings which may be manufactured with a minimum amount of labor.

In keeping with an aspect of the invention, these and other objects are accomplished by a two-piece self-locking end fitting and a swaging die. In one embodiment, an end fitting piece is a collar which slips over an end of the hose. The other piece has an annularly serrated insert end which fits inside an end of a thick-walled hose while the collar is in place over the outside end of the hose. A second embodiment uses an insert to make a thin-walled hose stiff enough to slip into a collar. Then, in both embodiments, the swaging die is slid forward over the collar to reduce its overall diameter and thereby compress the collar and capture the hose against the annular serrations on the insert. A special interlocking ridge and mating valley are formed in the two parts to prevent their disengagement after the diameter of the hose has been reduced.

A preferred embodiment of the invention is seen in the attached drawings wherein.

Figure 3:
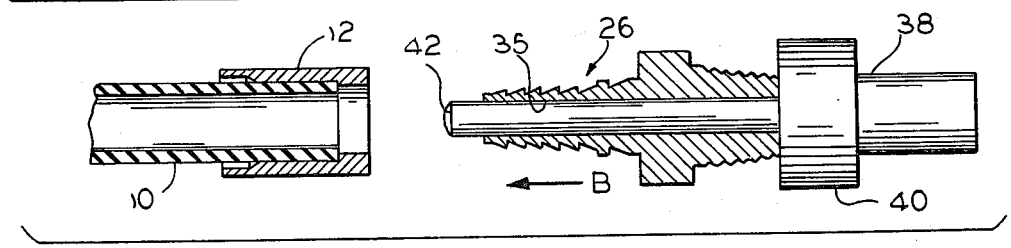
Figure 4:
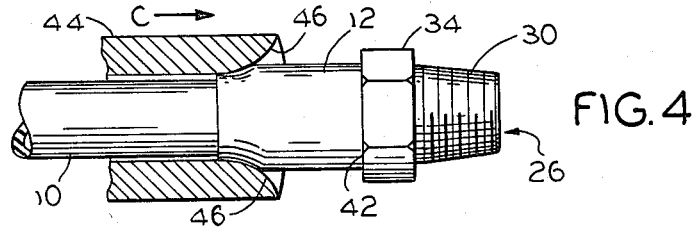
Figure 5:
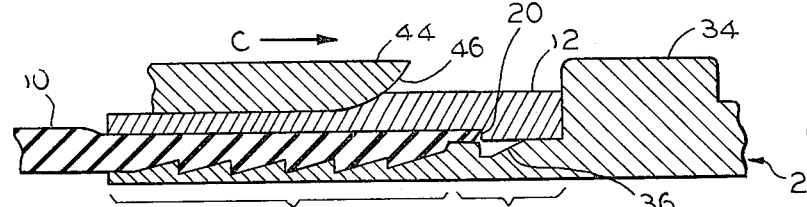
Figure 6:
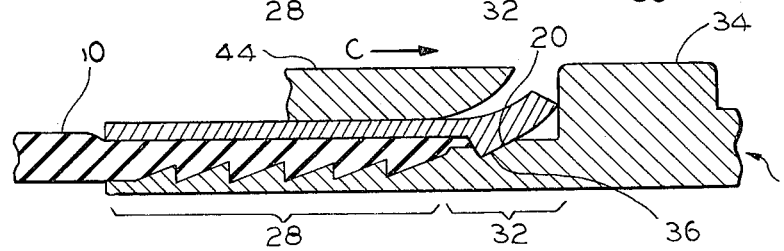
Figure 7:
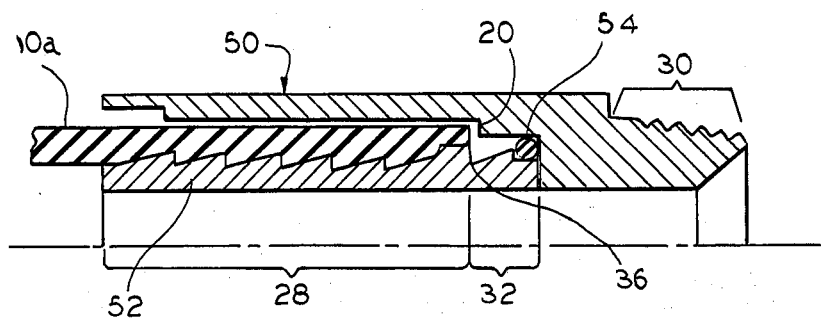
Figure 8:
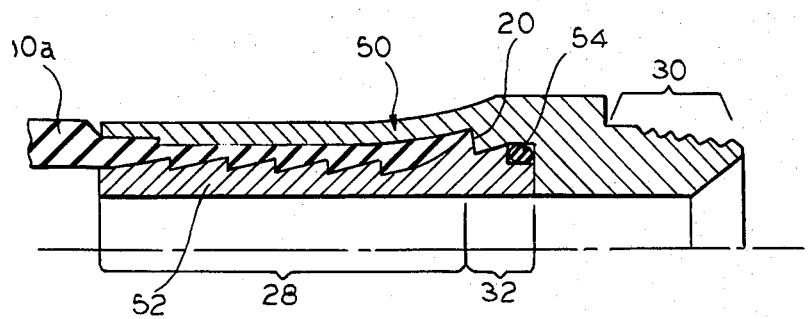

FIG. 3 schematically shows a tool which is useful for inserting the insert into the end of the hose;

FIG. 4 shows a hose and end fitting in elevation, and a swaging die partly in cross section, at the start of a swaging process;

FIG. 5 schematically shows in stop motion a fragment of a hose, end fitting and swaging die just before interlocking members are sealed together;

FIG. 6 shows the same parts that are seen in FIG. 5, just after the interlocking is completed responsive to a full travel of the swaging die; and FIGS. 7 and 8 are two views similar to FIGS. 5 and 6, which show a similar concept for use with thin-walled hoses, except that the external connection is made by the collar rather than by the insert.

Figure 1:
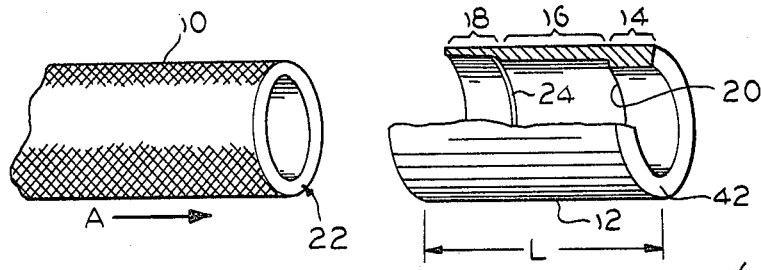
FIG. 1 is a perspective view, partly in cross section, of one embodiment which shows a locking collar about to slide over an outside end of a thick-walled hose.
Figure 2:
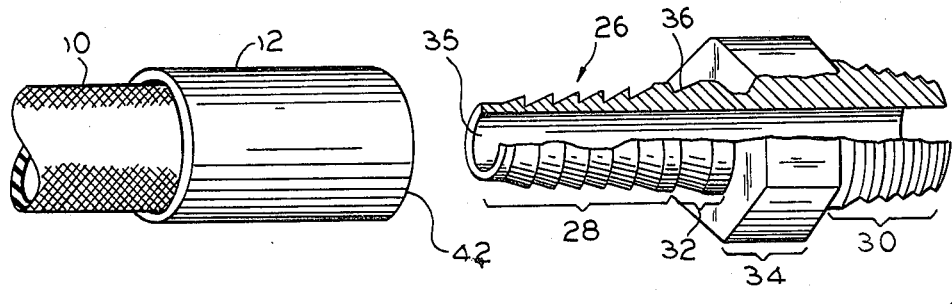
FIG. 2 is a perspective view, partly in cross section, which shows an interlocking insert that is about to be inserted into an inside end of the hose while the locking collar is resting thereon.

In FIG. 1, a thick-walled hose 10 is shown as it is about to be inserted into a cylindrical locking collar 12. The hose 10 may take any of many suitable forms which are known to those skilled in the art such as those taught by Gazda et al. and Lalikos et al.

The collar 12 is preferably turned, stamped, or extruded from brass which is, for example, known in the trade as "half hard" brass (one such brass being identified by the code CA360). The outside diameter of collar 12 is uniform throughout its length. The internal diameter is stepped to provide three distinct regions 14, 16, 18. A first region 14 is relatively thick-walled with a sharp annular edge at 20. A second region 16 has an inside diameter which is substantially equal to the outside diameter of the hose. Therefore, if the end 22 of the hose 10 slips in the direction A through the region 16, it bottoms on the thick-walled region 14. The third region 18 has an inside diameter which is sufficiently larger than the outside diameter of the hose 10 to enable an easy insertion. The two regions 16, 18 are joined by a tapered area 24 which acts somewhat as a funnel for guiding and directing the end 22 of the hose 10 into the region 16.

In an exemplary locking collar, the total length L was approximately two-thirds of an inch. A typical inside diameter of the thick-walled region 14 was about 0.235"–0.239", of the region 16 (and the outside diameter of the hose 10) was about 0.327"–0.331", and of the region 18 was about 0.392"–0.396". The tapered section 24 made an angle of about 30° with respect to the axis of the collar. The length of the region 14 was about 0.178"–0.182", of the region 16 was about 0.363"–0.359", and of the region 18 was about 0.125".

The other piece of the fitting or insert 26 includes a longitudinal series of annular serrations formed along an end 28 thereof. A suitable coupler, here shown as a threaded end 30, is separated from serrated end 28 by an interlocking member 32, and a hexagon nut-like, abutment wall region 34. A central bore 35 extends longitudinally through the entire length of the part 26. The serrated end 28 forms an insert member which may be pressed into the end of the hose 10. As will become more apparent, the interlocking member 32 includes an annular valley 36 which completely surrounds the insert piece 26 in the vicinity of the nut-like, abutment wall region 34 which limits penetration of the end 28 into the hose. The sharp edge (FIG. 1) inside the collar 12 forms an annular ridge 20 which completely surrounds the internal bore of the collar. Together, the valley 36 and the ridge 20 cooperate to form a special interlocking member.

In order to assemble the fitting, the collar 12 is fitted over the end of hose 10 and then clamped in a jig. Next, the insert piece 26 is slipped over any suitable mandrel 38 (FIG. 3), until it bottoms on an enlarged stop section 40. A stem 42 of the mandrel projects completely through the bore 35. The outside diameter of the tip of the stem 42 is much smaller than the inside diameter of the hose 10. Therefore, the end of stem 42 slips easily into the hose and the serrated fitting end 28 follows, as the mandrel moves in the direction B, while the collar 12 remains clamped in a stationary position. The thickness of the hose walls is adequate to provide the mechanical strength to enable an insertion of the internal part of the fitting. Any suitable jigs, tools, or fixtures may be provided to facilitate the insertion.

FIG. 4 shows, in side elevation, how the end fitting assembly appears after the insert piece 26 is fitted into the end of the hose, surrounded by collar 12. The thick end 42 of the collar 12 abuts against the hexagon nut-like, abutment wall region 34. Next, any suitable means (not shown) clamps the two fitting parts 12 and 26 in the assembled position seen in FIG. 4.

A swaging die 44 surrounds the hose 10 and is supported for a sliding motion in the direction C. This die may be constructed in any suitable manner. For example, it may have upper and lower parts which open so that they may be fitted over the outside surface of hose 10 and then closed. The internal area of the closed swaging die has a circular cross section with an inside diameter which is equal to the desired outside diameter of the collar 12 on the finished fitting.

The forward end of the swaging die 44 has a rounded, somewhat funnel shape which guides and directs the swaging die as it moves in the direction C from the hose, to and over the collar 12, as seen in FIG. 4. The relatively thin collar section 18 easily forms a smaller diameter as the swaging die 44 moves over the collar 12. As the die continues to move in the direction C (FIG. 5), the thicker collar section 16 is reduced in diameter while the plastic material of the hose 10 is firmly pressed into the annular serrations on the end 28 of the insert piece 26.

After the swaging die 44 has moved in the direction C along virtually the entire length of the collar 12, the sharp annular edge or locking ridge 20 of collar 12 is automatically canted firmly into the mating annular locking valley 36 of the insert 26. Thus, the collar 12 cannot be removed from the insert piece 26.

Of course, the interlocking parts could be reversed to place the ridge 20 on the insert piece 26 and the valley 36 on the collar 12. Likewise, the annular serrations 28 may be formed on the inside cylindrical surface of the collar 12, or they could be formed on both the collar 12 and the insert piece 26.

After the swaging die 44 reaches the end of its travel, it is opened and removed from the fitting. Then, the completed fitting (FIG. 6) is removed from the tool, jig or fixture, which had been holding it while the swaging die was being moved.

The particular coupler exemplified by the threaded end 30 of the insert piece 26 is given by way of example only. Any suitable ending coupler may be secured by the insert piece 26 in lieu of the threaded end 30. Since various hose ending couplers are well known in the art, it is thought that no further description need be given of them.

The embodiment of FIGS. 5 and 6 is especially well suited for use with thick-walled plastic hoses. If thin-walled hoses are used, the embodiment of FIGS. 7 and 8 may be preferred. The corresponding parts of FIGS. 5–8 are identified by the same reference numerals and will not be described again.

Those parts which are shown in FIGS. 5 and 6 as the collar 12, nut 34, and threaded end 30 are combined in FIGS. 7 and 8 into a single part 50, which fits over the outside and the end of the hose 10a. A second and separate piece 52 includes the serrated grooved end 28 and locking valley member 32. The inner end of member 52 terminates in a groove for receiving an O-ring 54. The O-ring 54 seats against the inside bottom of the collar member 50. After the collar member 50 is swaged in place (FIG. 8), the hose 10a is securely attached to the fitting.

The advantage of the embodiment is that the member 52 may be inserted into the end of the thin-walled hose 10a. Thereafter, the thin walls of the hose 10a are rigid enough to enable the hose to be inserted into the collar 50. In the embodiment of FIGS. 5 and 6, the end 26 of the inner fitting must be inserted into the end of the hose 10. Therefore, the thick walls of the hose 10 (FIGS. 5 and 6) must be rigid enough to receive the inner fitting.

Those who are skilled in the art will readily perceive how various modifications may be made without departing from the scope and the spirit of the invention. Therefore, the appended claims are to be construed broadly enough to cover all equivalent structures.

I claim:

1. An end fitting for flexible polytetrafluoroethylene hoses, said end fitting being made of two integral metal piecepart means, a first of said piecepart means having an initial cylindrical form of a collar means having a first and substantially annular interlocking shoulder means of relatively small inside diameter formed around an internal surface near one end thereof, said collar having a smooth and unbroken inside diameter extending from said annular shoulder means throughout a middle region of said collar with a second inside diameter which is larger than said small inside diameter, said inside diameter of said middle region snugly receiving the outside diameter of said hose, a compression relief end region on an opposite end of said collar having an inside diameter which is larger than the second inside diameter, said end region having an inside diameter which is larger than the outside diameter of said hose, a tapered region joining said end region and said middle region, and said second piecepart means being in the form of an insert means having a second and substantially annular interlocking groove means formed around an external surface thereof, said second piecepart having an abutment wall on one side of said annular groove interlocking means, the second piecepart means having an end on the opposite side of said second annular groove interlocking means with an outside diameter which slips into the inside diameter of said hose, a series of annular serrations formed along the length of said one side, each annular serration having a vertical wall on a side nearest said second annular interlocking means, each serration having a sloping surface beginning at the top of said vertical wall and tapering downwardly with a progressively smaller outside diameter to the root of the vertical wall on the adjacent serration, the middle region of said collar means being reduced in diameter to capture said flexible hose between said collar and the serrated end of said second piecepart means which slips into said hose, said collar sliding over said hose until said one end comes into contact with said abutment wall, said two pieceparts being joined by sliding a swaging die over the outside of said collar which die uniformly extrudes the metal of said collar and reduces the outside diameter and the collar wall thickness of the first piecepart as said die slides from said compression relief end toward said one end of said collar, said first and second interlocking means mating and meshing together in close and intimate metal-to-metal contact when said collar is reduced in diameter by the extruding metal of said collar, said annular interlocking means on said collar initially pivoting and canting into the annular interlocking member on said second piecepart means responsive to sliding of said swaging die and thereafter forming said intimate contact.

2. The end fitting of claim 1 and connector means formed on an end of said insert means which is opposite the end which slips into said hose.

3. The end fitting of claim 1 and connector means formed on an end of said collar which projects beyond the end of said hose.

* * * * *